United States Patent Office 3,830,941
Patented Aug. 20, 1974

3,830,941
FOOD COATING COMPOSITION AND
PROCESS USING SAME
Leslie R. Luft and Daniel G. Murray, Muscatine, Iowa,
assignors to Grain Processing Corporation, Muscatine,
Iowa
No Drawing. Filed July 5, 1972, Ser. No. 269,150
Int. Cl. A23d 5/00; A23l 1/27
U.S. Cl. 426—177           5 Claims

ABSTRACT OF THE DISCLOSURE

Flavored edible coating compositions for foods such as snack foods comprising oil-water emulsions and a starch hydrolyzate having a relatively low dextrose equivalent value.

---

This invention relates to coatings for foods, and more particularly to flavored edible coatings for snacks and other foods.

Various snack foods such as popcorn, corn chips, potato chips and so forth are available in flavored varieties. Butter and cheese are frequently added to popcorn, and corn chips and potato chips come in a variety of flavors, such as barbecue flavored and the like. In the preparation of such foods it is desirable that the food be substantially uniformly coated with a flavoring agent and at the same time be aesthetically pleasing and not exhibit a sticky or oily consistency as is the case with conventional methods of preparing butter and cheese flavored popcorn. Sugar solutions are commonly applied to foods such as doughnuts and the like but such sugar glazes are sweet and thus not compatible with other flavors such as onion, garlic, cheese and the like.

It is a principal object of this invention to provide an improved method of producing coated foods in which a desired flavor is incorporated in the coating.

A further object of the invention is to provide a food coating composition in which oil-soluble or water-soluble flavoring agents can be readily incorporated.

It is another object of the invention to provide food products having thereon a desired flavor coating which is not of an oily or sticky consistency.

The improved food coatings of this invention comprise oil-water emulsions and as a bodying agent a starch hydrolyzate having a relatively low dextrose equivalent value (D.E.) in the range of about 8 to 28. Such low D.E. hydrolyzates are known in the art as hydrolyzed cereal solids or malto-dextrins and it is known that they can be produced by the controlled hydrolysis of starch with acids and/or enzymes. The starch hydrolyzates increase the total solids content of the coating emulsions thereby reducing the moisture content. Accordingly, the hydrolyzates serve to increase the rate of drying of the coatings. Particularly advantageous and preferred low dextrose equivalent starch hydrolyzates and their method of preparation are disclosed in copending patent application Ser. No. 707,557, filed Feb. 23, 1968 by Alpha L. Morehouse, Ronald C. Malzahn and John T. Day, now U.S. Pat. No. 3,663,369. In general, low dextrose equivalent hydrolyzed cereal solids have a bland taste, contribute little sweetness, have low hygroscopicity and possess suitable solubility in water. The particular food application will govern the choice of hydrolyzed cereal solids to employ. The low dextrose equivalent materials, such as 9-12 D.E. materials, contribute less sweetness, are less soluble and contribute the most viscosity to aqueous solutions. Thus, for applying flavors such as butter, cheese, meat, vegetable, taco and like flavors which are not compatible with sweetness, the low dextrose equivalent materials are preferred. On the other hand, the "high" dextrose equivalent materials, such as those having D.E. values of 18 to 28, are more soluble and contribute less viscosity to aqueous solutions but do contribute some slight sweetness to the food product. Thus, these higher dextrose equivalent materials can be employed to coat food products such as snack foods where some slight sweetness is permitted and the food is not sensitive to the more hygroscopic nature of the higher D.E. materials. Examples of flavors compatible with some slight sweetness are barbecue, pork and bean flavors. Hydrolyzed cereal solids having intermediate D.E. values, such as 13 to 17 D.E., can be used advantageously where low sweetness and low viscosity formulations are desired.

Representative of the basic coating composition according to the present invention is the following:

| Component: | Percent Wt. |
|---|---|
| Oil | 15–40 |
| Water | 20–40 |
| Hydrolyzed cereal solids (D.E.—8–28) | 15–60 |
| Emulsifying agent | 0.1–3.0 |
| Flavor | (¹) |
| Food color | (¹) |
| Protein | 1–15 |

¹ As desired.

The oil employed in the coating composition is an edible food grade hydrogenated animal fat or hydrogenated vegetable oil such as cottonseed oil, soybean oil, olive oil, peanut oil, corn oil, safflower oil and the like.

Any suitable oil-soluble or water-soluble food flavor or flavors can be employed as well as desired food colors.

The emulsifiers which are employed are known edible oil and water emulsifying agents such as, for example, mono-di-glycerides, polysorbates, sorbitan monostearates, natural gums and the like.

The protein materials are employed in the composition as stabilizers and/or flavors and such representative materials are sodium caseinate, calcium caseinate, soy isolate, soy concentrate, soy flour, nonfat dry milk, milk whey solids, dried cheese solids, buttermilk solids, vegetable proteins, cottonseed proteins and so forth.

In preparing the coating composition it is preferred to blend the oil and emulsifier together in a melted condition and if an oil-soluble flavor is employed to incorporate the flavor with this "oil mix." The hydrolyzed cereal solids together with other components including water-soluble flavors are added to water and then blended with the "oil mix." The finished coating composition is preferably applied to snack foods at elevated temperatures such as 125° F. to 200° F. in any conventional manner that insures uniform coating. Thus, the coating composition can be applied to snack food in a revolving coating pan, a screw conveyor, a fluidized bed contactor and similar equipment which will continuously expose the snack food to the coating to achieve uniform distribution of the coating over the surface thereof. The coating composition can be metered onto the snack food as a separate stream in a continuous process or a premeasured quantity thereof can be added to the snack food in a batch operation.

In order to further illustrate the present invention the following specific examples are provided.

EXAMPLE 1

CHEESE GLAZED POPCORN

| | Ingredients, coating formula | Pounds | Percent by weight |
|---|---|---|---|
| A | Coconut oil (100° F. melting point) | 2 lbs., 8 oz. | 25.0. |
| | Mono-di-glycerides | (27 g.) | 0.6. |
| | Imitation cheddar cheese flavor (oil soluble). | To suit | To suit. |
| B | Hydrolyzed cereal solids (10 D.E.) | 2 lbs., 11 oz. | 26.9. |
| | Salt | 4 oz. | 2.5. |
| | Water | 3 lb. | 30.0. |
| | Dehydrated cheddar cheese | 1 lb., 8 oz. | 15.0. |
| | Total | 10 lbs. | 100.0%. |

Procedure (1) Melt "A" ingredients together. Allow a tempering period for stabilization of flavors.

(2) Prepare heated solution of hydrolyzed cereal solids, salt and water.

(3) Blend "A" and "B" phases together. Add cheese powder and blend into mixture until uniform.

(4) For optimum handling, adjust temperature of coating preparation to 160° F.

(5) Spray onto preheated popcorn, while tumbling in heated coating reel.

(6) Dry with heated air while tumbling (approximately 30 minutes).

POPCORN PRODUCT

| Percent of | Batch weight | Finished product (after drying) |
|---|---|---|
| Popcorn | 36 | 45 |
| Coating | 64 | 55 |
| Total | 100 | 100 |

EXAMPLE 2

BUTTER—GARLIC FLAVORED GLAZED POPCORN

| | Ingredients, coating formula | Percent grams | Percent by weight |
|---|---|---|---|
| A | Hydrolyzed cereal solids (10 D.E.) | 82.500 | 33.00 |
| | Salt | 8.750 | 3.500 |
| | Sodium caseinate | 5.000 | 2.000 |
| | Imitation butter flavor | 0.143 | 0.057 |
| | Color solution | 3.000 | 1.200 |
| | Consists of: | | |
| | Water | 98.49 | |
| | F.D. & C. Color Yellow #5 | 1.13 | |
| | F.D. & C. Color Yellow #6 | 0.38 | |
| | Total | 100.00 | |
| | Garlic powder | 0.250 | 0.100 |
| | Water | 74.107 | 29.643 |
| B | Hydrogenated coconut oil, 92° F. melting point | 75.000 | 30.000 |
| | Mono-di-glycerides | 1.500 | 0.600 |
| | Total | 250 | 100.000 |

Procedure (1) Prepare solution of "A" ingredients, using warm water.

(2) Melt "B" ingredients together at low temperature.

(3) Blend "A" and "B" together.

(4) For optimum handling, adjust temperature of coating preparation to 160° F. prior to spraying on popcorn.

(5) Spray onto preheated popcorn while tumbling in heated coating reel.

(6) Dry with heated air while tumbling (approximately 20 minutes).

POPCORN PRODUCT

| | Batch weight, ounce | Percent finished product (after drying) |
|---|---|---|
| Popcorn | 5.0 | 45 |
| Coating | 8.8 | 55 |
| Total | | 100 |

EXAMPLE 3

Taco Flavored Snack Coating

| Ingredients: | Percent by weight |
|---|---|
| Coating formula: | |
| (A) Hydrolyzed cereal solids (10 D.E.) | 24.67 |
| Water | 22.90 |
| Tomato paste (25% solids) | 9.56 |
| Taco seasoning | 5.74 |
| Jalapeno pepper puree | 4.78 |
| Salt | 2.41 |
| (B) Cheddar powder | 3.44 |
| (C) Mono-di-glycerides | 0.10 |
| Polysorbate 60 | 0.60 |
| Coconut oil | 25.80 |
| Total | 100.00 |

Procedure (1) Blend "A" ingredients until uniform.

(2) Heat "C" ingredients to about 150° F. to melt together. Blend "B" ingredients into "C."

(3) Add "A" to "C," blend well, and heat to 160° F. for applying to snack.

EXAMPLE 4

"Cream" Coated Cereal

| Ingredients: | Percent by weight |
|---|---|
| (A) Imitation cream flavor | (1) |
| Coconut oil | 22.00 |
| Mono-di-glycerides | 0.50 |
| (B) Hydrolyzed cereal solids (10 D.E.) | 27.50 |
| Salt | 0.50 |
| Water | 33.50 |
| Dehydrated cream | 16.00 |

¹ To suit.

Procedure (1) Melt "A" ingredients together. Allow a tempering period.

(2) Prepare warm solution of "B."

(3) Blend "A" and "B" together. Add the powdered cream and blend until uniform.

(4) Heat coating to 160° F.

(5) Spray onto hot cereal, while tumbling in pan coater reel.

(6) Dry with heated air while tumbling.

In lieu of the cream flavor, other non-sweet or low sweetness flavors such as bacon and egg, sausage, cheese and so forth could be applied to the cereal.

In a manner similar to the above examples, flavored coating compositions can be applied to potato or corn chips, puffed products, crackers, extruded snack foods, various cereals and processed cereals such as corn, wheat and rice cereals and similar foods.

Foods coated with compositions as described herein have generally a glazed shiny appearance but are not greasy or oily to touch. The coating compositions exhibit good adherence to the food but are not tacky. Very importantly, true flavors are not masked and the coating compositions contribute very little sweetness, particularly when low D.E. hydrolyzed cereal solids are employed.

Those modifications and equivalents which fall within the spirit of the invention are to be considered a part thereof.

What is claimed is:

1. A composition adapted for coating food which comprises an emulsion containing from about 15 to 40% by weight of an edible oil, about 20 to 40% by weight of water, about 0.1 to 3% by weight of an emulsifying agent, about 1 to 15% by weight of a protein ingredient, and from about 15 to 60% by weight of a starch hydrolyzate having a dextrose equivalent value of from about 8 to about 28.

2. A composition in accordance with claim 1 containing a flavoring agent.

3. A composition in accordance with claim 1 containing a food coloring agent.

4. A process for coating a food with a coating which comprises contacting the food with a liquid medium comprising an emulsion containing from about 15 to 40% by weight of an edible oil, about 20 to 40% by weight of water, about 0.1 to 3% by weight of an emulsifying agent, about 1 to 15% by weight of a protein ingredient, and from about 15 to 60% by weight of a starch hydrolyzate having a dextrose equivalent value of from about 8 to about 28.

5. The process of claim 4 wherein the food is popcorn.

References Cited
UNITED STATES PATENTS

| | | | |
|---|---|---|---|
| 3,318,706 | 5/1967 | Fast | 99—83 |
| 3,582,336 | 6/1971 | Rasmusson | 99—83 |

RAYMOND N. JONES, Primary Examiner

U.S. Cl. X.R.

426—93, 94, 99, 201, 302, 363

UNITED STATES PATENT OFFICE
CERTIFICATE OF CORRECTION

Patent No. 3,830,941           Dated  August 20, 1974

Inventor(s)  Leslie R. Luft and Daniel G. Murray

It is certified that error appears in the above-identified patent and that said Letters Patent are hereby corrected as shown below:

Column 3, in the table between lines 15 and 25, delete "Percent of" as a heading for the first column of the table;

the heading of the second column of the table should read -- % Batch Wt. --;

the heading of the third column of the table should read -- % Finished Product (after drying) --.

Column 3, in the table between lines 30 and 50, insert -- % -- as a heading for the first column of figures;

delete "Percent" in the heading for the second column of figures (this heading should read -- Grams --)

Signed and sealed this 29th day of October 1974.

(SEAL)
Attest:

McCOY M. GIBSON JR.
Attesting Officer

C. MARSHALL DANN
Commissioner of Patents